US008108500B2

(12) United States Patent
Peeters et al.

(10) Patent No.: US 8,108,500 B2
(45) Date of Patent: Jan. 31, 2012

(54) PROBING-BASED AUTO MODING

(75) Inventors: Miguel Peeters, Mechelen (BE);
Raphael Cassiers, Mechelen (BE);
Benoit Christiaens, Mechelen (BE);
Ruben Lysens, Mechelen (BE); Olivier Van De Wiel, Rhode St. Genese (BE)

(73) Assignee: Broadcom Corporation, Irvine, CA (US)

( * ) Notice: Subject to any disclaimer, the term of this patent is extended or adjusted under 35 U.S.C. 154(b) by 1829 days.

(21) Appl. No.: 10/812,097

(22) Filed: Mar. 30, 2004

(65) Prior Publication Data

US 2004/0255056 A1 Dec. 16, 2004

Related U.S. Application Data

(60) Provisional application No. 60/477,953, filed on Jun. 13, 2003.

(51) Int. Cl.
*G06F 15/173* (2006.01)
(52) U.S. Cl. ...................................................... 709/223
(58) Field of Classification Search .................. 709/228
See application file for complete search history.

(56) References Cited

U.S. PATENT DOCUMENTS

| 5,068,838 | A | * | 11/1991 | Klausner et al. | 368/47 |
| 5,375,018 | A | * | 12/1994 | Klausner et al. | 368/47 |
| 5,430,727 | A | * | 7/1995 | Callon | 370/401 |
| 5,889,470 | A | * | 3/1999 | Kaycee et al. | 370/465 |
| 6,396,531 | B1 | * | 5/2002 | Gerszberg et al. | 348/14.01 |
| 6,532,229 | B1 | * | 3/2003 | Johnson et al. | 370/351 |
| 6,535,504 | B1 | * | 3/2003 | Johnson et al. | 370/351 |
| 6,594,715 | B1 | * | 7/2003 | Lai | 710/52 |
| 6,650,658 | B1 | * | 11/2003 | Mueller et al. | 370/480 |
| 6,668,041 | B2 | * | 12/2003 | Kamali et al. | 379/1.04 |
| 6,801,570 | B2 | * | 10/2004 | Yong | 375/219 |
| 6,876,725 | B2 | * | 4/2005 | Rashid-Farrokhi et al. | 379/1.04 |
| 6,952,430 | B2 | * | 10/2005 | Lacey, III | 370/503 |
| 6,970,501 | B1 | * | 11/2005 | Bremer et al. | 375/222 |
| 6,987,754 | B2 | * | 1/2006 | Shahar et al. | 370/349 |
| 7,027,405 | B1 | * | 4/2006 | Khadavi | 370/244 |
| 7,212,536 | B2 | * | 5/2007 | Mackiewich et al. | 370/395.42 |
| 7,263,174 | B2 | * | 8/2007 | Schmidt et al. | 379/1.04 |
| 7,302,698 | B1 | * | 11/2007 | Proudler et al. | 726/2 |
| 7,359,434 | B2 | * | 4/2008 | Shahar et al. | 375/222 |
| 7,388,945 | B2 | * | 6/2008 | Pythoud | 379/1.03 |

(Continued)

OTHER PUBLICATIONS

International Telecommunication Union, Series G: Transmission Systems and Media, Digital Systems and Networks: Digital Sections and Digital Line System—Access Networks. Asymmetric Digital Subscriber Line Transceivers 2 (ADSL2). ITU-T Recommendation G.992.3. Jul. 2002. pp. 1-312.*

*Primary Examiner* — Wing Chan
*Assistant Examiner* — Alicia Baturay
(74) *Attorney, Agent, or Firm* — Sterne, Kessler, Goldstein & Fox P.L.L.C.

(57) ABSTRACT

A method for selecting a mode of operation for at least two modems is described. First, a handshake procedure is performed in order to determine a set of possible modes of operation supported by said modems. From said set of possible modes of operation, a set of favorable modes of operation is derived. In case there exist two or more favorable modes of operation, a probing-based selection is performed that comprises evaluating respective performances of said favorable modes of operation. The favorable mode of operation with the best performance is selected as a resultant mode of operation.

28 Claims, 4 Drawing Sheets

U.S. PATENT DOCUMENTS

| | | | |
|---|---|---|---|
| 7,391,780 B1* | 6/2008 | Stone et al. | 370/395.41 |
| 7,418,513 B2* | 8/2008 | Chang et al. | 709/230 |
| 7,478,031 B2* | 1/2009 | Master et al. | 703/22 |
| 7,584,295 B2* | 9/2009 | Katayama et al. | 709/237 |
| 2002/0120874 A1* | 8/2002 | Shu et al. | 713/201 |
| 2002/0124094 A1* | 9/2002 | Chang et al. | 709/230 |
| 2003/0099286 A1* | 5/2003 | Graziano et al. | 375/222 |
| 2003/0128669 A1* | 7/2003 | Lacey, III | 370/252 |
| 2003/0204606 A1* | 10/2003 | Selgas et al. | 709/228 |
| 2004/0071101 A1* | 4/2004 | Lu et al. | 370/282 |

* cited by examiner

| Standard | Annexes |
|---|---|
| G.992.1 | A, B, C |
| G.992.2 | A/B, C |
| G.992.3 | A, B, I, J, L |
| G.992.4 | A, I |
| G.992.5 | A, B, I, J, L |

FIG. 2

PROBING-BASED AUTO MODING

CROSS-REFERENCE TO RELATED APPLICATIONS

This application claims the benefit of the filing date of U.S. provisional Application No. 60/477,953, filed Jun. 13, 2003, the entirety of which is incorporated by reference as if set forth fully herein.

BACKGROUND OF THE INVENTION

1. Field of the Invention

The present invention relates to a method for selecting a mode of operation for at least two modems that communicate via a communications network. Furthermore, the invention relates to a modem unit adapted for transmitting data via a communications network.

2. Related Art

The present disclosure refers to the following recommendations, standards, drafts and contributions, the subject matter of which is expressly incorporated herein by reference in their entirety as if fully set forth:

[G.992.1] Recommendation G.992.1 (formerly known as G.dmt), entitled "Asymmetrical Digital Subscriber Line (ADSL) Transceivers", published in June 1999 by the International Telecommunication Union.

[G.992.2] Recommendation G.992.2 (formerly known as G.lite), entitled "Splitterless Asymmetrical Digital Subscriber Line (ADSL) Transceivers", published in June 1999 by the International Telecommunication Union.

[G.992.3] Recommendation G.992.3, entitled "Asymmetric Digital Subscriber Line (ADSL) Transceivers-2 (ADSL2)", published by the International Telecommunication Union.

[G.992.4] Recommendation G.992.4, entitled "Splitterless Asymmetric Digital Subscriber Line Transceivers-2 (Splitterless ADSL2)", published by the International Telecommunication Union.

Most homes and businesses are connected to telephone networks using twisted pair copper wires. Until recently, these wires were used to carry data traffic in the analogue voice band. However, with the advancement of technology, particularly Digital Subscriber Line (DSL) technology, the transfer of data over the higher frequencies in the twisted pair copper wires is becoming more prevalent. The greatest advantage of DSL is that it enables data to be exchanged over the twisted pair copper wires at much higher speeds than conventional modems and analogue lines. The present invention is not limited to xDSL protocol standards.

Modem units that communicate via a communications network are initialized to a common mode of operation. The mode of operation might e.g. be an xDSL mode of operation, or a mode of operation according to any other protocol standard. If several different modes of operation are supported by the modem units, the best performance will be obtained by selecting a most suitable mode of operation.

SUMMARY OF THE INVENTION

The present invention provides a method for selecting a mode of operation for at least two modems that communicate via a communications network. The method includes (a) performing a handshake procedure in order to determine a set of possible modes of operation supported by said modems; (b) deriving, from the set of possible modes of operation, a set of favorable modes of operation; (c) in case there exist two or more favorable modes of operation, performing a probing-based selection that comprises evaluating respective performances of the favorable modes of operation and selecting the favorable mode of operation with the best performance as a resultant mode of operation.

In one variant, the various protocol standards supported by the modems comprise xDSL standards, e.g.—but not limited to—protocol standards G.992.1, G.992.2, G.992.3, G.992.4, G.992.5. Optionally, one or more of the possible modes of operation are related to particular annexes of the xDSL standards, e.g.—but not limited to—one or more of G.992.1 annexes A, B, C; G.992.2 annexes A, B, C; G.992.3 annexes A, B, I, J, L; G.992.4 annexes A, I; G.992.5 annexes A, B, I, J, L.

In yet another variant, favorable modes of operation are derived from a set of possible modes of operation by performing a priority-based selection. The priority-based selection comprises a first level of priority-based selection, whereby from the possible modes of operation, a first set of favorable modes of operation is selected based on priorities assigned to different classes of upstream tone usage. The classes of upstream tone usage comprise, in descending order of priority, annex J type, annex B type, and annex A type.

In another variant, due to at least one of hardware specific constraints, cross-talk related restrictions, specific operator choice of allowed modes of operation, said modes being selected in dependence on deployment strategy, or restrictions imposed by regulatory authorities, one or more of the different classes of upstream tone usage may be excluded from the priority-based selection. The priority-based selection comprises a second level of priority-based selection, whereby, from the first set of favorable modes of operation, a second set of favorable modes of operation is selected based on priorities assigned to various protocol standards. The various protocol standards comprise at least one of the protocol standards G.992.5, G.992.4, G.992.3, G.992.1, G.992.2, and non-ITU standards.

In yet another variant of the method, substantially the same priority is assigned to the protocol standards G.992.3, G.992.4, and G.992.5.

In yet another aspect, the probing-based selection comprises initialising the modems to a probing mode of operation. For example, from the set of favorable modes of operation, the mode of operation with the highest downstream bandwidth might be chosen as a probing mode of operation. In yet another aspect, the probing mode of operation is a diagnostic mode.

In another variant, the probing-based selection comprises measuring line conditions, for example—but not limited to—the signal to noise ratio, for the probing mode of operation. In yet another variant, the probing-based selection comprises estimating line conditions, for example—but not limited to—the signal to noise ratio. Optionally, the probing-based selection comprises determining, for each of the favorable modes of operation, at least one of an upstream bit rate and a downstream bit rate.

In yet another aspect, the probing-based selection comprises a step of determining, for each of the favorable modes of operation, a performance index indicating the performance of the respective mode of operation. For each one of the favorable modes of operation, a performance index indicating the performance of the respective mode of operation is derived from line conditions determined for the probing mode of operation. In yet another variant, for each of the favorable modes of operation, a performance index PI is determined as $$PI = \alpha_{d'}(DS - DS_{min}) + \alpha_{u'}(US - US_{min}),$$

in which DS and US denote the downstream and the upstream bit rate, $DS_{min}$ and $US_{min}$ denote the minimum downstream and the minimum upstream bit rate, and in which $\alpha_d$ and $\alpha_u$ denote arbitrary parameters.

In another variant, the favorable mode of operation with the highest performance index is selected as the resultant mode of operation. In another aspect, in case all the performance indices of the favorable modes of operation are equal to a maximum, a secondary performance index is determined and evaluated for each of the favorable modes of operation. In yet another variant, the probing-based selection comprises deciding whether the modems have to be re-initialised before data transmission is started.

In another aspect, the priority-based selection is optionally disabled. In yet another variant, the probing-based selection is optionally disabled.

In yet another variant, the invention provides for a modem unit adapted for transmitting data via a communications network. The modem unit includes a transmission unit adapted for performing a handshake procedure in order to determine a set of possible modes of operation, and for deriving, from the set of possible modes of operation, a set of favorable modes of operation; and a probing facility adapted for performing, in case there exist two or more favorable modes of operation, a probing-based selection that comprises evaluating respective performances of the favorable modes of operation, whereby the favorable mode of operation with the best performance is selected as a resultant mode of operation.

Optionally, the protocol standards supported by the modem unit comprise xDSL standards, and in particular at least one of the protocol standards G.992.1, G.992.2, G.992.3, G.992.4, G.992.5. The modem unit is either a central xDSL modem or a remote xDSL modem. Optionally, the modem unit is adapted for deriving the set of favorable modes of operation from the set of possible modes of operation by performing a priority-based selection.

In yet a further variant, the priority-based selection comprises a first level of priority-based selection, whereby from the possible modes of operation, a first set of favorable modes of operation is selected based on priorities assigned to different classes of upstream tone usage.

In yet a further aspect, the priority-based selection comprises a second level of priority-based selection, whereby, from the first set of favorable modes of operation, a second set of favorable modes of operation is selected based on priorities assigned to various protocol standards.

The probing facility is optionally adapted for initialising the modem unit to a probing mode of operation. In another aspect, the probing facility is adapted for one of measuring or estimating line conditions, for example—but not limited to—the signal to noise ratio. In another variant, the probing facility is adapted for determining, for each of the favorable modes of operation, a performance index indicating the performance of the respective mode of operation. In yet another variant, the probing facility is adapted for selecting the favorable mode of operation with the highest performance index as the resultant mode of operation. In another aspect, the probing facility is adapted for deciding whether the modems have to be re-initialised before data transmission is started.

In yet a further variant, the invention provides a software program or product, stored on a data carrier, for executing the methods described herein when the computer program product is executed on a computer, processing unit, digital signal processor, or the like.

It is appreciated that these and other aspects of the invention will become apparent to those skilled in the art in the detailed description and drawings contained herein.

BRIEF DESCRIPTION OF THE DRAWINGS

FIG. 2 shows a variety of different modes of operation;

DETAILED DESCRIPTION

Figure 1:
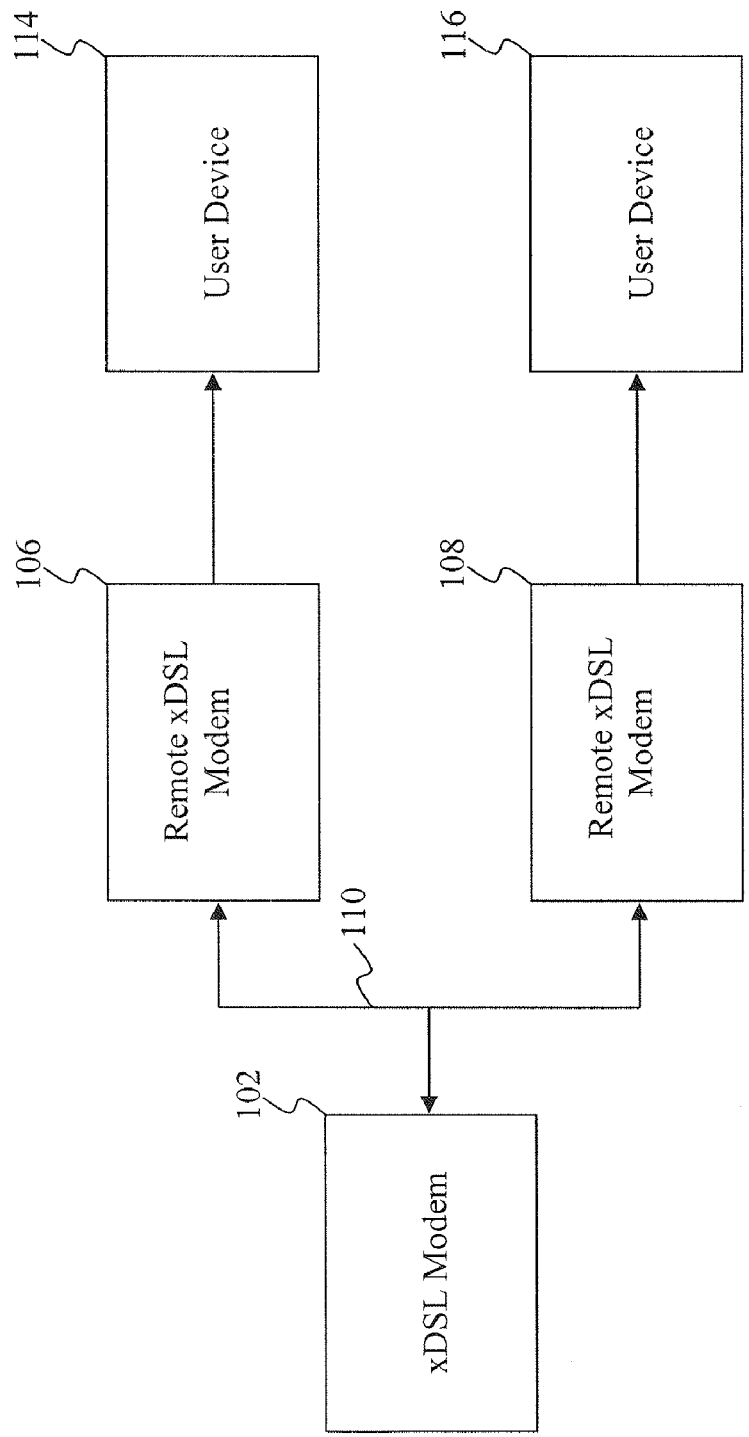
FIG. 1 is a block diagram of a communications system.

The present invention provides a method for selecting a mode of operation for at least two modems, whereby the at least two modems communicate via a communications network. The method comprises a step of performing a handshake procedure in order to determine a set of possible modes of operation supported by the modems. The method further comprises a step of deriving, from the set of possible modes of operation, a set of favorable modes of operation. In case there exist two or more favorable modes of operation, a probing-based selection is performed that comprises evaluating respective performances of the favorable modes of operation and selecting the favorable mode of operation with the best performance as a resultant mode of operation.

During the handshake procedure, the modems exchange their respective capabilities, in order to determine a set of possible modes of operation supported by the modems. In the next step, a set of favorable modes of operation is derived from the set of possible modes of operation. The set of favorable modes of operation comprises a subset of the possible modes of operation. For example, it might be clear from the beginning that the performance accomplished by using certain possible modes of operation will never be as good as the performance accomplished by other modes of operation. In this case, it isn't necessary to consider these modes of operation in the subsequent probing-based selection. Furthermore, one or more of the possible modes of operation might e.g. be excluded from further consideration because of restrictions imposed by the regulatory authorities, because of hardware constraints, etc. In this pre-selection step, it is possible to considerably reduce the number of candidates. Hence, the further procedure is simplified.

For the remaining modes of operation, a probing-based selection is performed in order to determine the favorable mode of operation with the best performance. The respective performances of the favorable modes of operation are determined based on probing results, whereby the actual properties of the local loop are considered during the probing-based selection. The resultant mode of operation obtained in the probing-based selection yields the highest possible performance for a certain local loop.

By performing a pre-selection step, the probing-based selection can be limited to the most relevant modes of operation. For these favorable modes of operation, the respective performances can be determined at low expenditure, in a short period of time.

The protocol standards supported by the modems comprise xDSL standards, in particular at least one of the protocol standards G.992.1, G.992.2, G.992.3, G.992.4, G.992.5. In xDSL transmission, the performance of the various modes of operation depends to a large degree on the respective properties of the local loop. Therefore, it is advantageous to utilize an auto moding method comprising a probing-based selection in order to accomplish an optimum performance.

One or more of the possible modes of operation is related to annexes of the xDSL standards, in particular to one or more of G.992.1 annexes A, B, C; G.992.2 annexes A, B, C; G.992.3 annexes A, B, I, J, L; G.992.4 annexes A, I; G.992.5 annexes A, B, I, J, L.

In one variant of the invention, the set of favorable modes of operation is derived from the set of possible modes of operation by performing a priority-based selection. In this embodiment, different priorities are assigned to the possible modes of operation. The set of favorable modes of operation is derived by selecting the possible modes of operation having the highest priorities. The priority-based selection allows to quickly detect the most relevant modes of operation. Only the high-priority modes of operation are considered during the subsequent probing-based selection. Hence, the overall expenditure for performing auto moding is significantly reduced.

The priority-based selection comprises a first level of priority-based selection, whereby from the possible modes of operation, a first set of favorable modes of operation is selected based on priorities assigned to different classes of upstream tone usage. In xDSL, the range of upstream tones utilized in the different standards and annexes is a critical property. For example, hardware specific constraints might have to be considered as well as restrictions imposed by regulatory authorities. For example, in certain countries, the frequency ranges reserved for POTS (Plain Old Telephone System) or ISDN might impose restrictions on the classes of upstream tone usage. For this reason, it is advantageous to provide a dedicated level of priority-based selection adapted for selecting the most suitable class of upstream tones.

The classes of upstream tone usage comprise, in descending order of priority, annex J type, annex B type, and annex A type. In annex J type, upstream tones ranging from 6 to 63 are used, in annex B type, the upstream tones range from 29 to 63, and in annex A type, the range of upstream tones extends from 6 to 32. Generally, a wide range of upstream tones is preferred, and for this reason, the highest priority is assigned to Annex J. If certain classes of protocols are disabled, other classes of upstream tones will become the ones with the highest priority.

Due to at least one of hardware specific constraints, crosstalk related restrictions, specific operator choice of allowed modes of operation, said modes being selected in dependence on deployment strategy, or restrictions imposed by regulatory authorities, one or more of the different classes of upstream tone usage may be excluded from the priority-based selection. In this case, only the remaining modes of operation are considered at the first level of priority-based selection.

Further, the priority-based selection comprises a second level of priority-based selection, whereby, from the first set of favorable modes of operation, a second set of favorable modes of operation is selected based on priorities assigned to various protocol standards. At this second level of priority-based selection, the highest priorities are assigned to the technologically advanced protocol standards, because more recent protocol specifications usually allow for a better performance and for higher transmission rates than former protocol standards. For this reason, the technologically most advanced modes of operation are generally considered as being most favorable. While the first level of priority-based selection is mainly related to rules and restrictions that have to be taken care of, technological aspects are considered at the second level of priority-based selection.

The various protocol standards are prioritised in a descending order of priority. The protocol standards might e.g. comprise at least one of the protocol standards G.992.5, G.992.4, G.992.3, G.992.1, G.992.2, and non-ITU standards. Substantially the same priority is assigned to the protocol standards G.992.3, G.992.4, and G.992.5. In general, the technologically most advanced protocol standards ADSL2+, ADSL2 (G.992.3/4/5) have priority over ADSL (G.992.1), which in turn has priority over ADSL Lite (G.992.2). Furthermore, ADSL2+, ADSL2, ADSL2 Lite, ADSL and ADSL Lite have priority over non-ITU modes such as e.g. ANSI (T1.413) or ETSI. It is advantageous to assign substantially the same priority to ADSL2+, ADSL2 Lite and ADSL2, because in dependence on the respective line conditions, any one of these standards might show the best performance. For this reason, none of the standards should be excluded at an early stage.

Optionally, the probing-based selection comprises a step of initialising the modems to a probing mode of operation. The probing mode of operation is used for gathering probing results related to properties of the local loop. For example, from the set of favorable modes of operation, the mode of operation with the highest downstream bandwidth might e.g. be chosen as a probing mode of operation. From probing results determined for a wide range of downstream frequencies, probing results corresponding to a reduced set of downstream tones can be derived with high accuracy. By doing this, the total time spent on gathering probing results is reduced.

In one embodiment, the probing mode of operation is a diagnostic mode. The diagnostic mode as defined in xDSL standard recommendations allows to gather probing results that indicate properties of the local loop. In an alternative embodiment, a fast probing mode is utilized. The fast probing mode, which deviates from the diagnostic mode as defined in the xDSL standard recommendation, allows to determine required properties of the local loop more quickly than the diagnostic mode.

The probing-based selection comprises measuring line conditions for the probing mode of operation. The line conditions might e.g. comprise signal-to-noise ratio (SNR), noise profile, line attenuation, channel noise, etc. The line conditions might be used as a starting point for deriving performance-related properties of various different modes of operation.

In a further alternative embodiment, the probing-based selection comprises estimating line conditions. Instead of measuring the properties of the local loop, the respective properties are estimated. In this embodiment, it is not necessary to perform measurements, and therefore, the estimated properties are available very quickly.

The probing-based selection comprises determining, for each of the favorable modes of operation, at least one of an upstream bit rate and a downstream bit rate. In this embodiment, the respective performance of a favorable mode of operation is represented by at least one of the upstream bit rate and the downstream bit rate. For example, the upstream bit rate, the downstream bit rate, or both the upstream and the downstream bit rate might be determined for the probing mode of operation, and for each of the favorable modes of operation, the corresponding upstream or downstream bit rates might be derived there from. Then, the favorable mode of operation with the highest bit rate(s) might be selected as a resultant mode of operation.

The probing-based selection comprises determining, for each of the favorable modes of operation, a performance index indicating the performance of the respective mode of operation. For each one of the favorable modes of operation, a performance index indicating the performance of the respective mode of operation is derived from line conditions determined for the probing mode of operation. Though the line conditions are only known for the probing mode of operation, all the required performance indices of favorable modes of operation can be derived there from. Hence, a measurement of the line conditions for the probing mode of operation allows to derive all the required performance indices. By comparing these performance indices, it is possible to predict which one of the favorable modes of operation will yield the best performance.

For each of the favorable modes of operation, a performance index PI is determined using the following formula:

$$PI=\alpha_d \cdot (DS-DS_{min})+\alpha_u \cdot (US-US_{min}),$$

in which DS and US denote the downstream and the upstream bit rate, with $DS_{min}$ and $US_{min}$ denote the minimum downstream and the minimum upstream bit rate, and in which ad and $\alpha_u$ denote arbitrary parameters. The terms $(DS-DS_{min})$ and $(US-US_{min})$ indicate the respective excess bandwidths in the upstream and downstream direction. By means of the weighting factors $\alpha_d$, $\alpha_u$, it is possible to define the relative impact of the excess bandwidths on the performance index PI. This allows to specify the relative importance of the upstream and the downstream bandwidth.

The favorable mode of operation with the highest performance is selected as the resultant mode of operation. The resultant mode of operation is best-suited for the actual line conditions.

In case all the performance indices of the favorable modes of operation are equal to a maximum, a secondary performance index is determined and evaluated for each of the favorable modes of operation. For example, in case the downstream and the upstream bit rate of all the favorable modes of operation are respectively equal to a maximum downstream bit rate $DS_{max}$ and to a maximum upstream bit rate $US_{max}$, the performance indices PI of the favorable modes of operation are all equal to $PI_{max}$. In this case, a secondary performance index is determined and evaluated for each of the favorable modes of operation. For example, the resultant mode of operation might be selected in a way that the cross talk on the line is kept as small as possible. Alternatively, the resultant mode of operation might be selected in a way that the time required to start data transmission is minimized.

The probing-based selection comprises deciding whether the modems have to be re-initialised before data transmission is started. Especially in case the diagnostic mode as defined in the xDSL standard recommendations has been used for gathering information about the local loop, a re-initialisation of the modems is carried out before data transmission is started.

In one variant, the priority-based selection is optionally disabled. Even when the priority-based selection is disabled, probing results may be collected. The probing results may e.g. be used for performing external auto moding. In another variant, the probing-based selection is optionally disabled.

FIG. 1 shows a block diagram of a communications system in accordance with embodiments of the present invention. The communications system 100 enables voice communications, video, and data services to be exchanged based on bi-directional transfer of Internet Protocol (IP) or Asynchronous Transfer Mode (ATM) (generally known as packet mode, but not limited to) traffic between a central xDSL modem 102 and a plurality of remote xDSL modems 106, 108 over a communications network 110.

The communications network 110 provides for the high-speed, reliable, and secure transport of data between the central xDSL modem 102 and the remote xDSL modems 106 and 108. The communications network 110 comprises twisted-pair copper telephone lines, coaxial cable, fiber optic cable, or a combination of coaxial cable and fiber optic cable linked via one or more fiber nodes.

The central xDSL modem 102 is found within a telephone company's central office, and the plurality of remote xDSL modems are found within individual homes and businesses. In the example communications system 100, only two remote xDSL modems 106 and 108 are shown. In general, the communications system 100 may include any number and type of central or remote xDSL modems.

Each of the remote xDSL modems 106 and 108 operates as an interface between the communications network 110 and at least one attached user device. In particular, the remote xDSL modems 106 and 108 perform the functions necessary to convert downstream signals received over the communications network 110 into IP or ATM data packets for receipt by an attached user device. Downstream refers to the direction of transmission from a telephone company's central office to a remote location such as a home or business. Additionally, the remote xDSL modems 106 and 108 perform the functions necessary to convert IP or ATM data packets received from the attached user device 114 and 116 into upstream burst signals suitable for transfer over the communications network 110. Upstream refers to the direction of transmission from a remote business or home to a telephone company's central office. Data other than IP or ATM packets may as well be carried over the communications system 100.

For example, in the communications system 100, each remote xDSL modem 106 and 108 does only support a single user device 114 and 116. In general, each remote xDSL modem 106 and 108 may support a plurality of user devices for communication over the communications system 100. User devices may include personal computers, data terminal equipment, telephony devices, broad band media players, network-controlled appliances, or any other device capable of transmitting or receiving data over a communication network.

FIG. 2 gives an overview of the various xDSL standards and their annexes, whereby a particular annex of a particular xDSL standard is related to a mode of operation of the communications system 100. Each one of the central xDSL modem 102 and the remote xDSL modems 106, 108 may support an individual subset of the modes of operation depicted in FIG. 2.

The standard G.992.1 relates to ADSL (Asymmetrical Digital Subscriber Line) and comprises the annexes A, B, C. In ADSL, the downstream tones extend up to 256, which corresponds to 1104 kHz.

The standard G.992.2 relates to ADSL Lite. This standard recommendation, which comprises the annexes A, B, C, is characterized by a restricted set of downstream tones that extend up to 128, which corresponds to an upper frequency limit of 552 kHz.

The standard ADSL2, which is defined in the standard recommendation G.992.3, has evolved from ADSL, also known as g.gmt. As in ADSL, the downstream tones extend up to 256, which corresponds to 1104 kHz. The standard recommendation G.992.3 comprises the annexes A, B, I, J, L.

The standard ADSL2 Lite is defined in the standard recommendation G.992.4. In ADSL2 Lite, the downstream tones extend up to 128, which corresponds to an upper limit of 552 kHz. As can be seen from FIG. 2, the standard recommendation G.992.4 comprises the annexes A, I.

In order to provide an increased bandwidth for the downstream, ADSL2+ has been developed. The standard ADSL2+ is defined in the standard recommendation G.992.5. In ADSL2+, the downstream tones extend up to 512, and therefore, the upper limit of the downstream band is shifted to 2208 kHz. In case the distance between the central office and the customer is not to large, high transmission rates can be accomplished by employing ADSL2+.

The various annexes defined for the different standard recommendations can be distinguished according to their upstream tone usage. In accordance with the upstream tone usage, the annexes of the above described standard recommendations can be divided into annex A type, annex B type and annex J type.

From FIG. 2, it can be seen that for all the above described standard recommendations (G.992.1/.2/.3/.4/.5), an annex A has been defined. In annex A, the upstream tones range from 6 to 32, and accordingly, the upstream frequencies range from 25 kHz to 138 kHz. The upstream band is located at rather low frequencies, above the frequencies used by POTS (Plain Old Telephone System). ADSL of the annex A type complies with the standards put up by North American Regulatory Authorities.

For the standard recommendations G.992.1 and G.992.2, a respective annex C has been defined. Annex C belongs to the annex A type, because for the upstream, a set of tones ranging from 6 to 32 is utilized. Annex C complies with the rules imposed by the regulatory authorities of Japan. Annex C can be employed together with the Japanese ISDN standard TCM (Time Compression Multiplex) ISDN, although there is an overlap between the xDSL upstream frequencies and the TCM ISDN band.

For the standard recommendations G.992.3 (ADSL2), G.992.4 (ADSL Lite) and G.992.5 (ADSL2+), an annex I has been defined. Annex I is similar to annex A, but the upstream tones range from 1 to 32 (in annex A, they range from 6 to 32). The upstream band does not extend beyond 138 kHz, and therefore, annex I also belongs to the annex A type. Annex I provides an all-digital loop.

The standard recommendation G.992.3 annex L defines a reach-extended ADSL with a reduced boosted downstream. The upstream tones do not extend beyond 32, and hence, annex L is similar to the annex A type. The annex L provides two possible upstream masks and two possible downstream masks. Hence, one may select one out of four possible combinations of upstream and downstream masks, in order to adapt to the transmission properties of the local loop. In both downstream masks, the tone set extends up to tone 128. By utilizing a reduced tone set, by increasing the PSD (Power Spectral Density), and by shaping the spectral transmission properties, an ADSL transmission with extended reach is accomplished.

All the modes of operation that have been discussed so far are of annex A type, which means that they utilize the frequency band below 138 kHz for upstream transmission. In modes of operation of the annex B type, a different frequency band is used for upstream transmission. In annex B, the upstream tones range from 29 to 63, which corresponds to frequencies between 125 kHz and 250 kHz. Compared to xDSL standards of the annex A type, the upstream band is shifted to higher frequencies. For this reason, xDSL standards of the annex B type can be used together with ISDN. This implies that by means of a splitter, ISDN traffic may be separated from xDSL traffic. As can be seen from FIG. 2, the standard recommendations G.992.1 (ADSL), G.992.2 (ADSL Lite), G.992.3 (ADSL2) and G.992.5 (ADSL2+) each comprise a respective annex B. For example, xDSL of the annex B type is employed in Germany.

Besides that, the standards ADSL (G.992.3) and ADSL2+ (G.992.5) comprise modes of operation of the annex J type. In these modes of operation, the range of upstream tones may extend from 1 (or from 6) up to 64. In particular, in G.992.3 annex J and G.992.5 annex J, a set of 9 different upstream masks is defined, with the first mask comprising tones from 1 to 32, with the second mask comprising tones from 1 to 36, etc., and with the last mask comprising tones from 1 to 64. In addition to G.992.3 annex J and G.992.5 annex J, also the standard G.992.5 annex L belongs to the annex J type. Also in the standard G.992.3 annex L, a set of 9 different upstream masks is defined, but in G.992.5 annex L, the upstream tones of each upstream mask start at 6. Hence, the upstream band is located above the frequencies required for POTS. The downstream tones extend from 64 to 512. G.992.5 annex L must not be confused with G.992.3 annex L, which is of the annex A type.

In addition to the modes of operation that have been described so far, the Central Office Equipment (CO) and the Customer Premise Equipment (CPE) might support further modes of operation. When performing auto moding, the additional modes of operation are also taken into account.

Figure 3A:
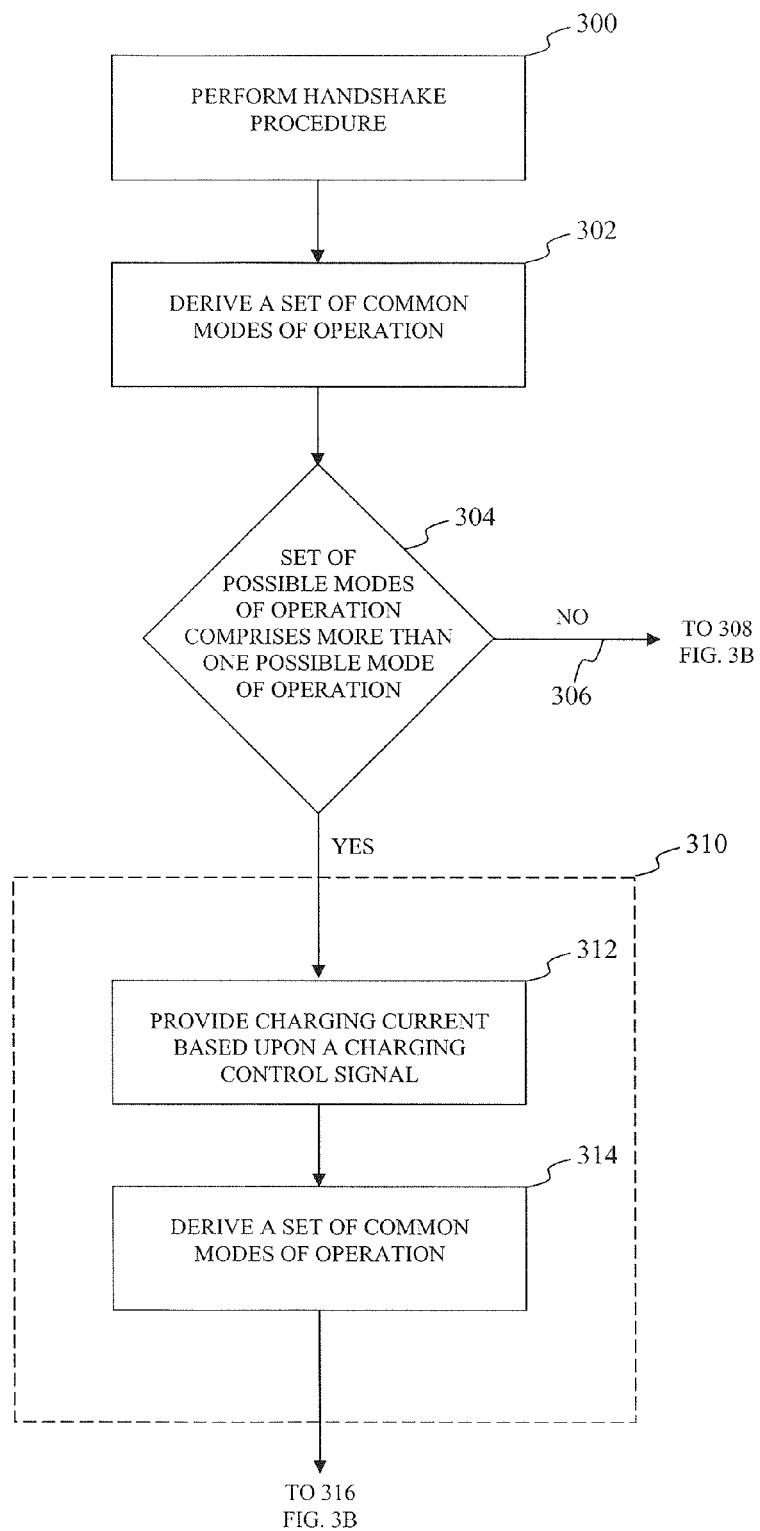
FIG. 3A is a flow chart of a method for performing auto moding in accordance with embodiments of the present invention.
Figure 3B:
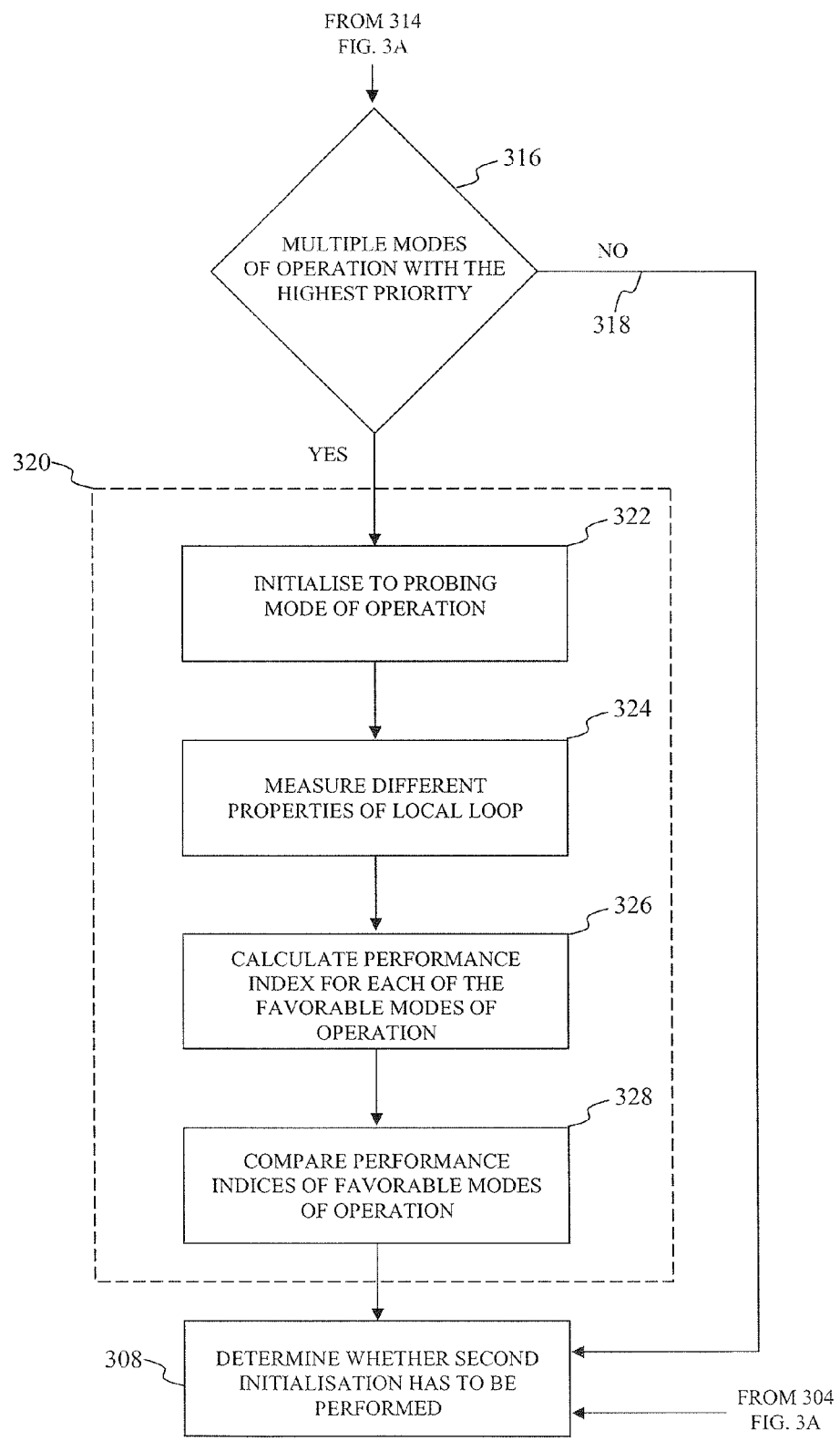
FIG. 3B continues the flow chart of the method for performing auto moding in accordance with embodiments of the present invention.

FIGS. 3A and 3B show a flow chart of an auto moding method according to embodiments of the present invention. At the beginning, in step 300, a handshake procedure is performed between a central xDSL modem and a remote xDSL modem. During the handshake procedure, which might e.g. be performed in accordance with the ITU-T Recommendation G.994.1 "Handshake Procedures For Digital Subscriber Line (DSL) Transceivers", the central xDSL modem and the remote xDSL modem exchange information about their respective capabilities. In particular, information related to the protocol standards and annexes supported by the modems is exchanged. In the subsequent step 302, a set of common modes of operation is derived from the respective capabilities of the central xDSL modem and the remote xDSL modem. The set of common modes of operation comprises all the protocol standards and annexes that are supported both by the central xDSL modem and the remote xDSL modem. Any one of the common modes of operation can be used for further data transmission between the central xDSL modem and the remote xDSL modem. For this reason, the common modes of operation will further on be referred to as possible modes of operation.

In step 304, it is checked whether the set of possible modes of operation comprises more than one possible operation mode, or whether there exists only one mode of operation supported by both modems. If there is just one possible mode of operation, the further proceeding will be very simple: the further auto moding procedure will be bypassed (306) and in step 308, both the remote modem and the central modem will be initialised to the possible mode of operation.

If step 304 leads to the result that there exist multiple modes of operation for initialising the xDSL link, it will be necessary to select, from the possible modes of operation, a resultant mode of operation. For this purpose, a priority-based selection 310 is performed first. The priority-based selection 310 comprises a first level 312 of priority-based selection. In this first level 312, a priority ranking of the possible modes of operation is performed in accordance with their upstream tone usage. In dependence on their respective upstream frequencies, the protocol standards and annexes shown in FIG. 2 can be classified into an annex A type, an annex B type and an annex J type. The priority ranking is performed as follows: annex J type has priority over annex B type, and in turn, annex B type has priority over annex A type. Within a certain communications network, it might not be allowed to use all of the classes of upstream tone usage. There might exist rules put up by the regulatory authorities that impose restrictions on the range of upstream frequencies. Furthermore, classes of upstream tone usage might be deactivated by the operators or by the system vendors, e.g. because of hardware constraints or crosstalk related constraints. By excluding the respective classes of upstream tone usage, the restrictions might be considered at the first level 312 of priority-based selection. A favorable mode of operation must not be selected from a class of upstream tones that has been excluded. The remaining modes of operation are ranked according to the above-mentioned priority list.

The remaining modes of operation with the highest priority are subjected to a second level 314 of priority-based selection. There, a priority ranking of the modes of operation is performed in accordance with their protocol type. In this respect, ADSL2 (G.992.3, G.992.4, G.992.5) has priority over ADSL (G.992.1) which has priority over ADSL Lite (G.992.2) which has priority over non-ITU standards. The non-ITU standards might e.g. comprise former protocol standards defined by ANSI (such as e.g. T1.413) or by ETSI. Hence, the priority list employed at the second level 314 of priority-based selection reflects the technological advancement of ADSL. To protocol standards that have been established recently, high priorities are assigned, whereby the priorities assigned to protocol standards that have been defined long ago are rather low.

The first level 312 and the second level 314 of priority-based selection can be thought of as two independent dimensions, whereby the first one of the dimensions represents the regulatory aspects, and whereby the second one of the dimensions represents the technological aspects.

After the priority-based selection 310 has been finished, it is determined, in step 316, whether there exist multiple modes of operation with the highest priority, or whether there only exists one mode of operation with the highest priority. In the latter case, the subsequent steps of the auto moding procedure are bypassed (318), and both the central modem and the remote modem are initialised, in step 308, to the favorable mode of operation.

In case there exist two or more favorable operation modes of high priority, a probing-based selection 320 is performed. In dependence on probing results gathered during the probing-based selection 320, a most suitable mode of operation is selected. The actual line conditions including e.g. signal-to-noise ratio (SNR), line attenuation, channel noise, noise profile, etc. can either be obtained by measurement or by estimation. FIGS. 3A and 3B correspond to an embodiment where the actual line conditions are determined by measurement. Hence, it is possible to consider the actual line conditions including e.g. signal-to-noise ratio (SNR), line attenuation, channel noise, noise profile, etc. when selecting the most suitable mode of operation.

Before the respective measurements are performed, both the remote modem and the central modem are initialised, in step 322, to a probing mode of operation.

In a first embodiment, the probing-based selection makes use of a diagnostic mode that is defined in the xDSL standard recommendations for determining the actual conditions of the local loop. The diagnostic mode allows to determine the parameters of the local loop with high accuracy. In an alternative embodiment, a fast probing mode that deviates from the standard recommendations is utilized. The fast probing mode allows to determine the required parameters of the local loop in a shorter period of time than the well-defined diagnostic mode, because it measures only those parameters that are actually required for the probing-based selection. If the diagnostic mode is used, it will be necessary to perform a second initialisation of the modems before starting data transmission. In contrast, if the fast probing mode is used during the probing-based selection, said second initialisation might not be necessary, and data transmission can be started without performing a second initialisation. Hence, by utilizing the fast probing mode, the overall delay can be reduced.

Preferably, a mode of operation comprising a rather broad downstream spectrum is chosen as a probing mode. Once the properties of the local loop are known for the probing mode's wide range of downstream frequencies, the respective properties of a somewhat smaller spectrum of downstream frequencies can be derived there from.

Of course, as mentioned above, the line conditions can also be obtained by estimation. In this case, it is not necessary to perform any measurements.

Let us assume that, e.g. due to regulatory restrictions, the annex A type of upstream tone usage has been selected at the first level 312 of priority-based selection. Let us further assume that both the remote modem and the central modem support the protocol standards G.992.3 (ADSL2), G.992.4 (ADSL2 Lite), and G.992.5 (ADSL2+). To all these protocol standards, the same level of priority might have been assigned. Furthermore, these protocols have priority over G.992.2, G.992.1, and over non-ITU standards. As an outcome of the priority-based selection 310, the following favorable modes of operation are obtained: G.992.3 annex A, G.992.3 annex L, G.992.4 annex A, G.992.5 annex A. With respect to these four favorable modes of operation, a probing-based selection is performed in order to determine the mode of operation that is best suited for the respective line conditions.

In this example, the standard G.992.5 (ADSL2+) annex A is selected as a probing mode of operation, because this standard comprises the widest range of downstream tones. In G.992.5 annex A, the downstream tones range from 64 to 512. If, for some reason, the modems cannot be initialised to the standard G.992.5 annex A, the modems will be initialised to a mode of operation with the next smaller downstream bandwidth.

In step 324, various different properties of the local loop are measured. The properties might e.g. comprise signal-to-noise ratio (SNR), spectral noise profile, line attenuation, channel noise, etc. The properties might e.g. be determined on the part of the central modem. Alternatively, the properties might e.g. be determined both on the part of the central modem and on the part of the remote modem.

From the above-mentioned properties of the local loop, in particular from the line's SNR, the upstream bit rate US and the downstream bit rate DS can be derived for the favorable modes of operation. Alternatively, the upstream and downstream bit rates might be measured directly. In any case, at the end of step 324, the downstream and upstream bit rates DS, US are known for each one of the favorable modes of operation.

In step 326, for each of the favorable modes of operation, a performance index PI is calculated. The performance index PI might e.g. be calculated according to the formula $$PI = \alpha_d \cdot (DS - DS_{min}) + \alpha_u \cdot (US - US_{min}),$$

in which DS and US denote the downstream and the upstream bit rate, $DS_{min}$ and $US_{min}$ denote the minimum downstream and the minimum upstream bit rate, and in which $\alpha_d$ and $\alpha_u$ denote arbitrary parameters. $DS_{min}$ and $US_{min}$ are determined during the handshake procedure. The parameters $\alpha_d$ and $\alpha_u$ denote weighting factors adapted for defining the relative weight of the terms $(DS-DS_{min})$ and $(US-US_{min})$, respectively. Besides that, additional parameters $DS_{max}$, $US_{max}$ denoting the maximum downstream and the maximum upstream bit rate might be exchanged. The term $(DS-DS_{min})$ indicates how much extra downstream bandwidth is provided by a certain mode of operation. Similarly, the term (US–

$US_{min}$) represents the extra bandwidth in the upstream direction for a certain mode of operation. By varying the weighting factors $\alpha_d$ and $\alpha_u$, it is possible to control the impact of the downstream bandwidth and the upstream bandwidth on the overall performance index PI. For example, by setting $\alpha_d$ to a rather high value, it is possible to promote operation modes with a large downstream bandwidth.

If the measured downstream and upstream bit rates DS, US exceed the predefined thresholds $DS_{max}$, $US_{max}$, a performance index PI equal to $PI_{max}$ is obtained for all the favorable modes of operation. In this case, the performance index PI is not very useful for determining which of the favorable modes of operation is best suited for the respective line conditions. In this case, one might select the favorable mode of operation that corresponds to the smallest amount of cross talk on the local loop. Alternatively, a favorable mode of operation might be selected that does not require any further initialisations. In this respect, it can be useful to determine, for each of the favorable modes of operation, a secondary performance index, with said secondary performance indices being additionally considered for selecting the most suitable mode of operation.

In step 328, the performance indices PI of the favorable modes of operation are compared to each other. In case secondary performance indices have been determined for the favorable modes of operation, the secondary performance indices might additionally be considered in step 328. The mode of operation with the best performance is selected as a resultant mode of operation.

In step 308, it is determined whether a second initialisation has to be performed before the data transmission mode is started, or whether it is not necessary to re-initialise the modems. Especially if the diagnostic mode has been utilized for gathering information about the properties of the local loop, it will be necessary to re-initialise the modems. In case a second initialisation is required, both the central modem and the remote mode are initialised to the resultant mode of operation as determined in step 328. After said second initialisation has been carried out, data transmission can be started.

In the above-mentioned example, the set of favorable operation modes for which a probing-based selection is performed comprises the four protocol standards G.992.3 annex A, G.992.3 annex L, G.992.3 annex A, and G.992.5 annex A. For each of the four modes of operation, the respective downstream and upstream bit rates DS and US are derived, and a performance index PI is calculated. Then, the mode of operation with the highest performance index PI is selected as a resultant mode of operation.

In case of short loop lengths, a wide range of downstream frequencies helps to increase the transmission bit rates. The standard ADSL2+ provides downstream tones ranging from 64 to 512. Accordingly, in case of a small loop length, the protocol standard G.992.5 annex A will probably have the highest performance index.

In case of intermediate loop lengths, a range of downstream tones extending up to 256 might be well-suited. In ADSL2, the downstream tones extend from 33 to 256. Accordingly, for intermediate distances, the protocol standard G.992.3 annex A will probably have the highest performance index.

In case of long loop lengths, high frequencies will be severely attenuated. In this case, it is most favorable to utilize a reduced set of downstream tones. The protocol standards G.992.3 annex L and G.992.4 annex A use a reduced range of downstream tones that extend up to 128. Because of the increased PSD, the highest performance index will most probably be accomplished by using G.992.3 annex L.

At the OAM (Operations And Maintenance Cell) interface, the operator or the system integrator may optionally disable auto moding. Furthermore, the operator or system integrator may optionally disable the probing mode. In case both auto moding and the probing-based selection are enabled, the auto moding procedure as shown in FIG. 3B is performed.

If the probing mode is disabled while auto moding is enabled, the probing-based selection of a most suitable mode of operation will be replaced by estimating the most suitable mode of operation. This strategy will also be pursued if the remote modem is not capable of performing the probing initialisation 322 shown in FIG. 3B, or if the remote modem does not successfully complete the probing initialisation 322.

In case the probing mode is enabled while auto moding is disabled, it is still possible to gather probing results after a probing initialisation has been performed. The probing results may then be used for performing an external auto moding.

If both auto moding and the probing mode are disabled, the resultant mode of operation will be selected in accordance with a protocol map provided at the OAM interface, and in accordance with a fixed priority list.

Although several variants of the invention have been described, they should not be construed to limit the scope of the appended claims. Those skilled in the art will understand that various modifications may be made to the described embodiment. Moreover, to those skilled in the various art, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention. Although such modifications and changes may be suggested by those skilled in the art, it is the intention of the inventors to embody within the patent warranted hereon all changes and modifications as reasonably and properly come within the scope of their contribution to the art.

We claim:

1. A method for selecting a resultant mode of operation for at least two modems that communicate via a communications network, comprising:
    (a) performing a handshake procedure to determine a set of possible modes of operation supported by the at least two modems, the set of possible modes of operation including protocol standards and annexes that are supported by the at least two modems;
    (b) selecting a first set of favorable modes of operation from among the set of possible modes of operation using a first level of priority-based selection based on priorities assigned to the annexes;
    (c) selecting a second set of favorable modes of operation from among the first set of favorable modes of operation using a second level of priority-based selection based on priorities assigned to the protocol standards; and
    (d) in case there exist two or more second favorable modes of operation from among the second set of favorable modes of operation, performing a probing-based selection by evaluating respective performances of each of the second favorable modes of operation and selecting a second favorable mode of operation with a best performance from among the second set of favorable modes as the resultant mode of operation.

2. The method of claim 1, wherein the protocol standard is selected from a group consisting of: G.992.1, G.992.2, G.992.3, G.992.4, and G.992.5.

3. The method of claim 2, wherein step (a) comprises:
(a)(i) performing the handshake procedure to determine the set of possible modes of operation supported by the at least two modems, the set of possible modes of operation being related to particular annexes of the protocol standard.

4. The method of claim 1, wherein step (b) comprises:
(b)(i) selecting the first set of favorable modes of operation from among the set of possible modes of operation using the first level of priority-based selection based on priorities assigned to different classes of upstream tone usage.

5. The method of claim 4, wherein the different classes of upstream tone usage comprise, in descending order of priority, annex J type, annex B type, and annex A type.

6. The method of claim 4, wherein one or more of the different classes of upstream tone usage are excluded from the first level of priority-based selection.

7. The method of claim 1, wherein the various protocol standards are prioritized in a descending order of priority, at least one of the various protocol standards being selected from a group consisting of: G.992.5, G.992.4, G.992.3, G.992.1, G.992.2, and non-ITU standards.

8. The method of claim 7, wherein the G.992.3, the G.992.4, and the G.992.5 standards are assigned a similar priority.

9. The method of claim 1, wherein step (d) comprises:
(d)(i) initialising the at least two modems to a probing mode of operation when the two or more second favorable modes of operation exist.

10. The method of claim 9, wherein step (d)(i) comprises:
(d)(i)(A) initialising the at least two modems to a diagnostic mode of operation when the two or more second favorable modes of operation exist.

11. The method of claim 9, wherein step (d) further comprises:
(d)(ii) deciding whether to re-initialise the at least two modems before data transmission is started.

12. The method of claim 1, wherein step (d) comprises:
(d)(i) measuring a condition of the communications network; and
(d)(ii) determining a signal-to-noise ratio of the communications network using the condition.

13. The method of claim 1 wherein step (d) comprises:
(d)(i) estimating a condition of the communications network; and
(d)(ii) determining a signal to noise ratio of the communications network using the condition.

14. The method of claim 1, wherein step (d) comprises:
(d)(i) determining at least one of an upstream bit rate and a downstream bit rate for each of the second favorable modes of operation.

15. The method of claim 1, wherein step (d) comprises:
(d)(i) determining a performance index indicating the respective performances for each of the second favorable modes of operation.

16. The method of claim 15, wherein step (d)(i) comprises:
(d)(i)(A) deriving the performance index indicating the respective performances for each of the second favorable modes of operation from line conditions of the communications network.

17. The method of claim 15, wherein step (d) further comprises:
(d)(ii) selecting the second favorable mode of operation with a highest performance index as the resultant mode of operation.

18. The method of claim 15, wherein step (d) further comprises:
(d)(ii) determining a secondary performance index when all of performance indices from among the performance index are equal to a maximum; and
(d)(iii) evaluating the secondary performance index for each of the second favorable modes of operation.

19. A method for selecting a resultant mode of operation for at least two modems that communicate via a communications network, comprising:
(a) performing a handshake procedure to determine a set of possible modes of operation supported by the at least two modems, the set of possible modes of operation including protocol standards and annexes that are supported by the at least two modems;
(b) deriving a set of favorable modes of operation from the set of possible modes of operation; and
(c) in case there exist two or more favorable modes of operation, determining a performance index indicating the respective performances for each of the favorable modes of operation according to:

$$PI = \alpha_{d'}(DS-DS_{min}) + \alpha_{u'}(US-US_{min}),$$

wherein DS and US denote the downstream and the upstream bit rate, respectively, $DS_{min}$ and $US_{min}$, denote the minimum downstream and the minimum upstream bit rate, respectively, and $\alpha_d$ and $\alpha_u$ denote weight factors, and selecting at least one of the set of favorable modes based upon the performance index as the resultant mode of operation.

20. A modem unit for transmitting data via a communications network, comprising:
a transmission unit configured:
(i) to perform a handshake procedure to determine a set of possible modes of operation, the set of possible modes of operation including protocol standards and annexes that are supported the modem unit,
(ii) to derive a first set of favorable modes of operation from among the set of possible modes of operation using a first level of priority-based selection based on priorities assigned to the annexes, and
(iii) to derive a second set of favorable modes of operation from among the first set of favorable modes of operation using a second level of priority-based selection based on priorities assigned to the protocol standards; and
a probing facility configured to perform a probing-based selection that comprises evaluating respective performances of the second favorable modes of operation from among the second set of favorable modes of operation when two or more second favorable modes of operation exist and to select a second favorable mode of operation with a best performance as a resultant mode of operation.

21. The modem unit of claim 20, wherein the modem unit is configured to support a protocol standard selected from the group consisting of at least one of the protocol standards: G.992.1, G.992.2, G.992.3, G.992.4, G.992.5.

22. The modem unit of claim 20, wherein the modem unit is implemented as part of either a central xDSL modem or a remote xDSL modem.

23. The modem unit of claim 20, wherein the first level of priority-based selection for selecting the first set of favorable modes of operation from among the set of possible modes of operation is based on priorities assigned to different classes of upstream tone usage.

24. The modem unit of claim 20, wherein the probing facility is further configured to initialise the modem unit to a probing mode of operation to perform the probing-based selection.

25. The modem unit of claim 20, wherein the probing-based selection comprises:
   determining line conditions of the communications network; and
   determining a signal-to-noise ratio of the communications network based upon the line conditions.

26. The modem unit of claim 20, wherein the probing facility is further configured to determine a performance index indicating the respective performances for each of the second favorable modes of operation when two or more second favorable modes of operation exist.

27. The modem unit of claim 26, wherein the probing facility is configured to select the second favorable mode of operation with a highest performance index as the resultant mode of operation when two or more second favorable modes of operation exist.

28. The modem unit of claim 20, wherein the probing facility is configured to decide whether the modem unit has to be re-initialised before data transmission is started.

* * * * *

UNITED STATES PATENT AND TRADEMARK OFFICE
CERTIFICATE OF CORRECTION

PATENT NO. : 8,108,500 B2
APPLICATION NO. : 10/812097
DATED : January 31, 2012
INVENTOR(S) : Peeters et al.

It is certified that error appears in the above-identified patent and that said Letters Patent is hereby corrected as shown below:

At column 16, line 38, "supported the" should read --supported by the--.

Signed and Sealed this
Nineteenth Day of March, 2013

Teresa Stanek Rea
*Acting Director of the United States Patent and Trademark Office*